United States Patent
Weller et al.

(10) Patent No.: US 10,027,547 B1
(45) Date of Patent: Jul. 17, 2018

(54) AUTONOMIC SELF-OPTIMIZATION OF PROTECTION STORAGE

(71) Applicant: EMC Corporation, Hopkinton, MA (US)

(72) Inventors: Steven Weller, Discovery Bay, CA (US); Mark Twomey, Cork (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 116 days.

(21) Appl. No.: 14/229,536

(22) Filed: Mar. 28, 2014

(51) Int. Cl.
*G06F 15/177* (2006.01)
*H04L 12/24* (2006.01)
*G06F 3/06* (2006.01)
*G06F 17/30* (2006.01)
*G06F 11/14* (2006.01)

(52) U.S. Cl.
CPC ........ *H04L 41/0823* (2013.01); *G06F 3/0641* (2013.01); *G06F 11/1453* (2013.01); *G06F 17/30156* (2013.01)

(58) Field of Classification Search
USPC ........................................................ 709/221
See application file for complete search history.

(56) References Cited

U.S. PATENT DOCUMENTS

| 6,006,289 | A * | 12/1999 | James | G06F 13/4059 370/431 |
|---|---|---|---|---|
| 8,228,804 | B2 * | 7/2012 | Ninan | H04L 43/0882 370/238 |
| 8,650,163 | B1 * | 2/2014 | Harnik | G06F 3/0605 707/692 |
| 9,209,950 | B2 * | 12/2015 | Luo | H04W 72/0406 |
| 9,258,771 | B2 * | 2/2016 | Esch | H04W 48/20 |
| 2003/0110250 | A1 * | 6/2003 | Schnitzer | H04L 41/142 709/224 |
| 2004/0073641 | A1 * | 4/2004 | Minhazuddin | H04L 29/06 709/223 |
| 2007/0294319 | A1 * | 12/2007 | Mankad | G06F 11/1662 |
| 2012/0317300 | A1 * | 12/2012 | Huang | H04L 65/4092 709/231 |
| 2013/0266310 | A1 * | 10/2013 | Fox | H04L 25/08 398/25 |
| 2014/0095439 | A1 * | 4/2014 | Ram | G06F 17/30159 707/640 |
| 2014/0120940 | A1 * | 5/2014 | Ren | H04W 16/14 455/454 |
| 2014/0136685 | A1 * | 5/2014 | Chan | H04L 41/142 709/224 |
| 2014/0281361 | A1 * | 9/2014 | Park | G06F 3/0641 711/206 |
| 2014/0289080 | A1 * | 9/2014 | Ippolito | G06Q 10/06 705/30 |
| 2014/0304239 | A1 * | 10/2014 | Lewis | G06F 3/0608 707/692 |

(Continued)

*Primary Examiner* — Richard G Keehn
(74) *Attorney, Agent, or Firm* — Womble Bond Dickinson (US) LLP (57) ABSTRACT

A network system comprises a first component, a second component, and a system for self-optimization. The system for self-optimization comprises an interface and a processor. The interface is configured to receive a performance indication from the first component. The processor is configured to determine a configuration change for the second component according to a set of configuration rules.

13 Claims, 7 Drawing Sheets

(56) References Cited

U.S. PATENT DOCUMENTS

2014/0365449 A1* 12/2014 Chambliss ........ G06F 17/30303
707/692
2015/0234710 A1* 8/2015 Berrington .......... G06F 11/1407
707/664

* cited by examiner

AUTONOMIC SELF-OPTIMIZATION OF PROTECTION STORAGE

BACKGROUND OF THE INVENTION

In a complex networked system, installation of a data protection system is a complicated and arduous task, often leading to a non-optimal data protection system configuration. Network system conditions can change over time, further bringing the data protection system configuration away from the ideal system configuration.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Autonomic self-optimization of protection storage is disclosed. A network system comprises a first component; a second component; and a system for self-optimization, comprising an interface configured to receive a performance indication from the first component; and a processor configured to determine a configuration change for the second component according to a set of configuration rules. The system for self-optimization additionally comprises a memory coupled to the processor and configured to provide the processor with instructions.

In some embodiments, a network system includes a plurality of network components (e.g., server systems, client systems, networking systems, etc.). A protection storage system for the network system comprises a set of network components configured to protect data on the network system (e.g., ensure that all network data is properly stored and backed up). A system for self-optimization monitors a set of performance indications for the protection storage system in order to ensure that the protection storage system is configured correctly. In various embodiments, the performance indications comprise host attached application configurations, host attached application versions, number of host attached applications using the protection storage, read and write throughput statistics, network connectivity and performance statistics, system software version information, protection storage functionality and performance, error and log files for infrastructure devices, host applications and protection storage software, or any other appropriate performance indications. A set of configuration rules stored by the system for self-optimization describes configuration changes to the system that are indicated to be made by the performance indications. The set of configuration rules describe protection storage best practices (e.g., best practices that a protection storage system administrator would typically attempt to implement). In various embodiments, configuration rules comprise host block size modification rules, stream modification rules, bandwidth optimization rules, application specific optimization rules, recovery time objective (RTO) optimization rules, recovery point objective (RPO) optimization rules, host kernel parameter modification rules, data type target optimization rules, system leveling optimization rules, file routing optimization rules, or any other appropriate configuration rules. Configuration rules describe rules to modify the configuration of the network component reporting the performance indication as well as configurations of other components attached to the network. In some embodiments, the system for self-optimization is used to perform an initial configuration of a protection storage system as it is installed as part of a network system. In some embodiments, the system for self-optimization is used to keep the system optimally configured as network conditions change. The system for self-optimization determines configuration changes according to the configuration rules and provides the configuration changes to the network components.

In some embodiments, the autonomic self-optimization of protection storage system gets indications from one system component and based on best practices and heuristic rules adjusts another system component.

Figure 1:
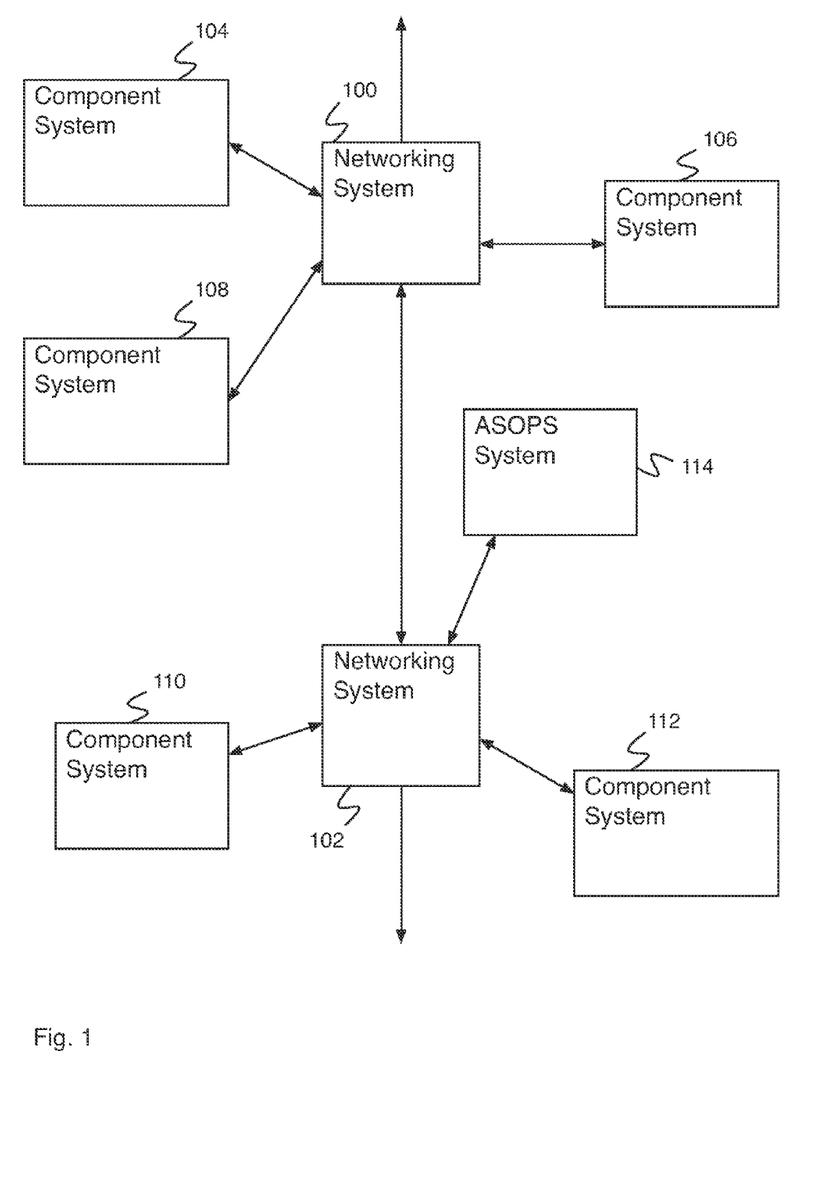
FIG. 1 is a block diagram illustrating an embodiment of a network system.

FIG. 1 is a block diagram illustrating an embodiment of a network system. In the example shown, the network system of FIG. 1 comprises a plurality of networking systems (e.g., networking system 100, networking system 102) communicating with one another to form a network (e.g., a local network, a wide area network, an intranet, a portion of the Internet, etc.). In various embodiments, networking systems comprise network routing systems, network firewall systems, network switching systems, or any other appropriate networking systems. In various embodiments, networking systems communicate via wired communications, wireless communications, cellular communications, optical communications, or any other appropriate communication type. The network system additionally comprises a plurality of network components (e.g., component system 104, component system 106, component system 108, component system 110, component system 112). In various embodiments, network components comprise server systems, backup systems, data protection systems, application server systems, client systems, storage systems, deduplicating storage systems, or any other appropriate network components. The network system additionally comprises ASOPS (e.g., autonomic self-optimization of protection storage system) system 114. In some embodiments, ASOPS system 114 receives performance indications from the plurality of networking systems and the plurality of component systems. In some embodiments, ASOPS system 114 determines configuration changes based on the performance indications according to a set of configuration rules and provides the configuration changes to the plurality of networking systems and the plurality of component systems.

Figure 2:
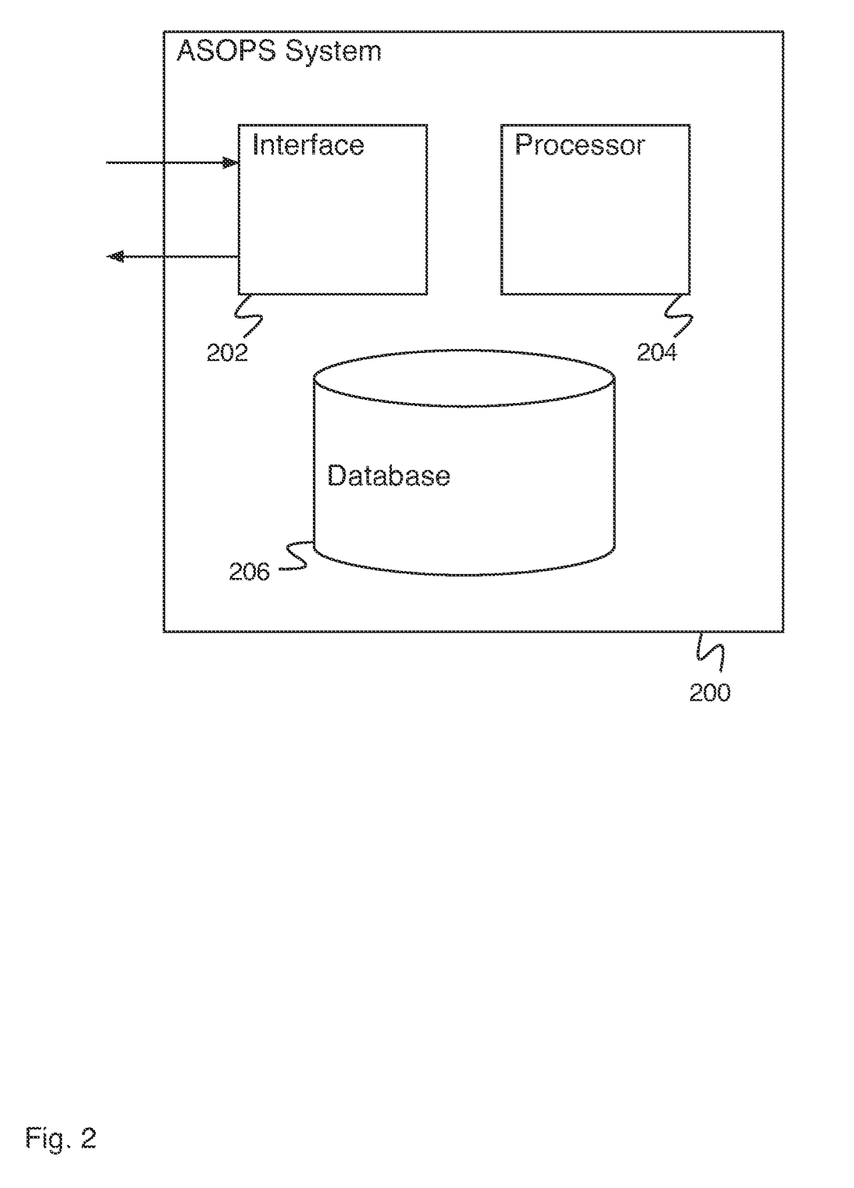
FIG. 2 is a block diagram illustrating an embodiment of an ASOPS system.

FIG. 2 is a block diagram illustrating an embodiment of an ASOPS system. In some embodiments, ASOPS system 200 comprises ASOPS system 114 of FIG. 1. In the example shown, ASOPS system 200 comprises interface 202, processor 204, and database 206. Interface 202 comprises an interface for communicating with external systems (e.g., networking systems, network components, etc.). In various embodiments, interface 202 comprises an interface for receiving performance indications, for receiving system configurations, for sending configuration changes, or for sending or receiving any other appropriate information. Processor 204 comprises a processor for processing data received (e.g., data received by interface 202) and determining data to send (e.g., data to send using interface 202). In some embodiments, processor 204 is configured to determine a configuration change (e.g., a configuration change for an external system). In some embodiments, a configuration change is based on a received performance indication. In some embodiments, the configuration change comprises a configuration change for the same system that sent the received performance indication. In some embodiments, the configuration change comprises a configuration change for a different system than the system that sent the received performance indication. Database 206 comprises a database for storing data. In some embodiments, database 206 comprises a system for storing a set of configuration rules. In some embodiments, processor 204 uses configuration rules to determine a configuration change based on a performance indication.

Figure 3:
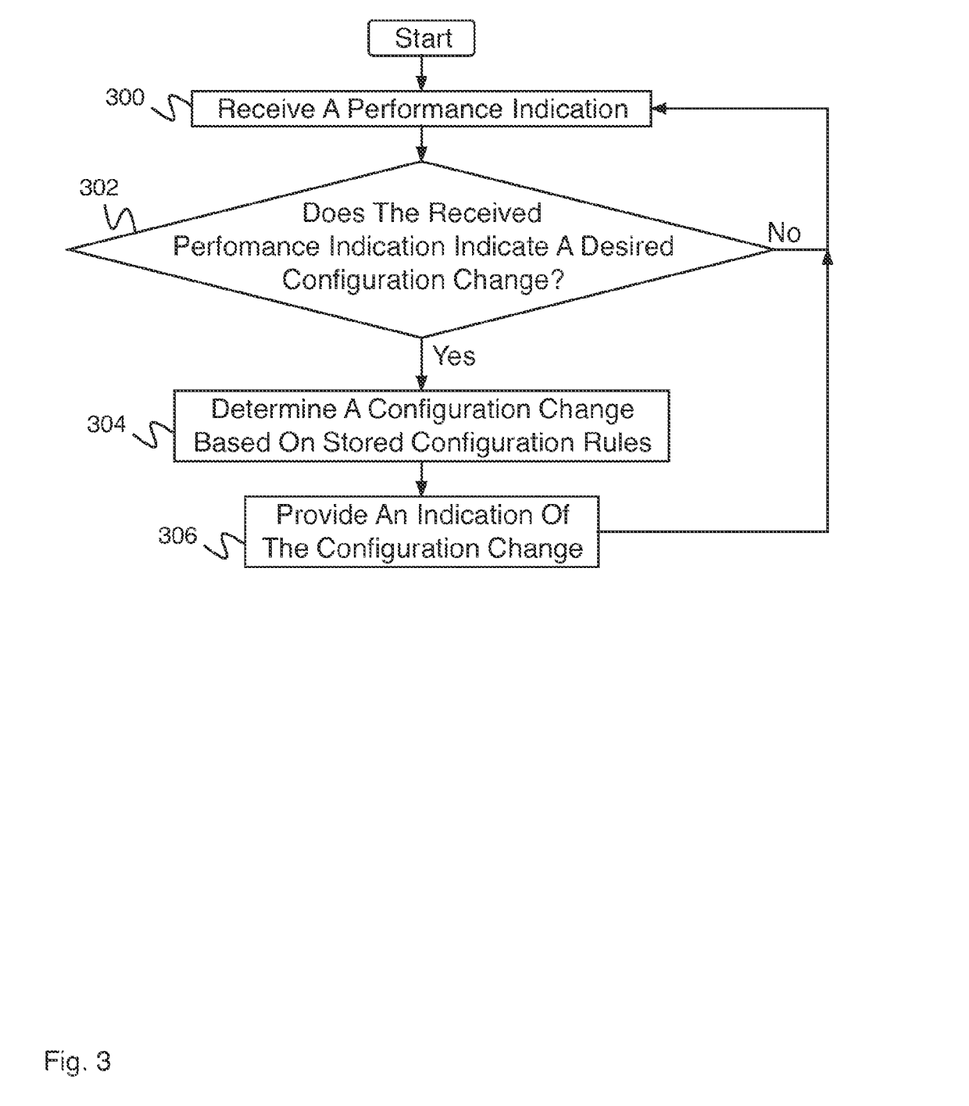
FIG. 3 is a flow diagram illustrating an embodiment of a process for autonomic self-optimization of protection storage.

FIG. 3 is a flow diagram illustrating an embodiment of a process for autonomic self-optimization of protection storage. In some embodiments, the process of FIG. 3 is executed by ASOPS system 114 of FIG. 1. In the example shown, in 300, a performance indication is received. In various embodiments, a performance indication is received from a networking system, a component system, or any other appropriate system. In various embodiments, a performance indication comprises a host attached application configuration, a host attached application version, a number of host attached applications using the protection storage, read and write throughput statistics, network connectivity and performance statistics, system software version information, protection storage functionality and performance, error and log files for infrastructure devices, host applications and protection storage software, or any other appropriate performance indication. In 302, it is determined if the received performance indication indicates a desired configuration change. In some embodiments, it is determined if the received performance indication indicates a desired configuration change using stored configuration rules (e.g., configuration rules stored in a database e.g., database 206 of FIG. 2). In various embodiments, it is determined that the received performance indication indicates a desired configuration change if the performance indication differs from a predetermined value, if the performance indication falls outside of a set of bounds, if the performance indication produces a predetermined output when processed by a nonlinear function, or if the performance indication meets any other appropriate criteria. If it is determined that the received performance indication does not indicate a desired configuration change, control passes to 300. If it is determined that the received performance indication indicates a desired configuration change, control passes to 304. In 304 a configuration change is determined based on stored configuration rules. In some embodiments, stored configuration rules comprise configuration rules stored in a database (e.g., database 206 of FIG. 2). In various embodiments, the configuration change comprises a configuration change for a networking system, a component system, or any other appropriate system. In some embodiments, the configuration change comprises a configuration change for the system that the performance indication was received from. In some embodiments, the configuration change comprises a configuration for a different system than the system that the performance indication was received from. In 306, an indication of the configuration change is provided (e.g., to the system that the configuration change is for), and control then passes to 300.

Figure 4:
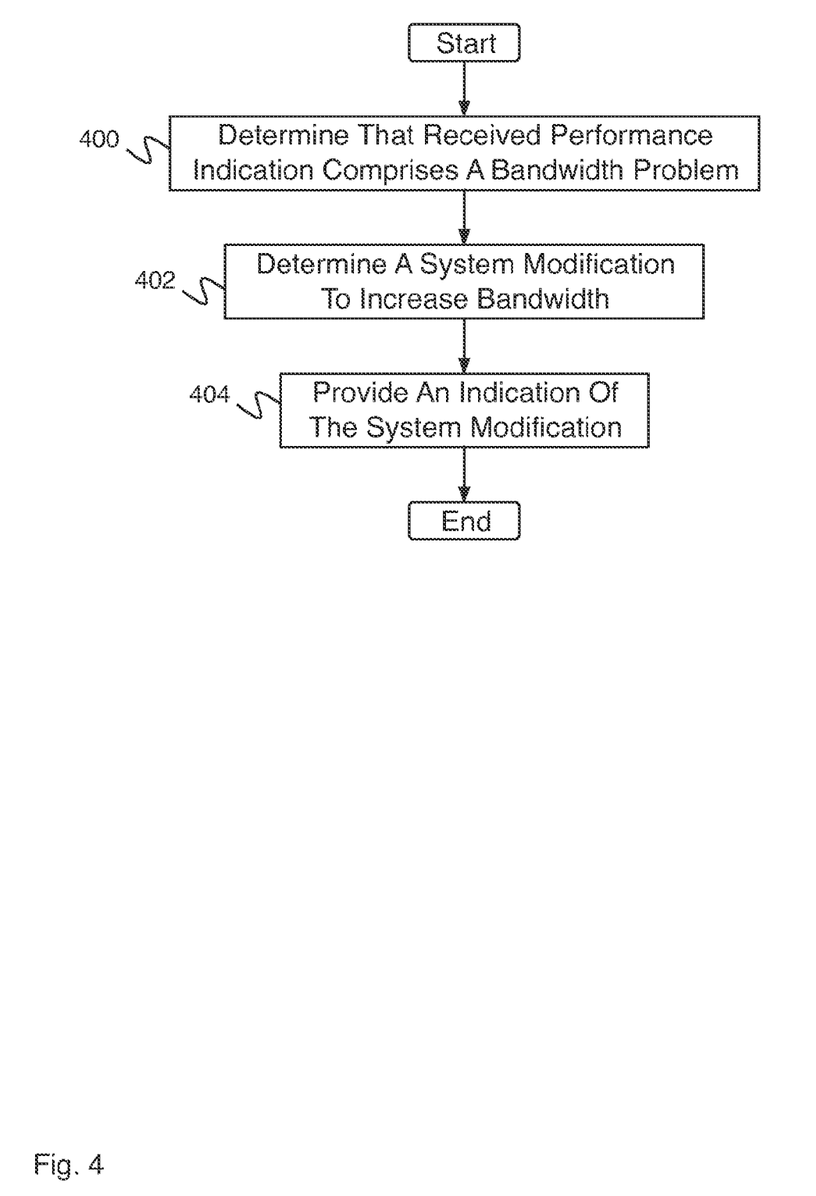
FIG. 4 is a flow diagram illustrating an embodiment of a process for determining a configuration change based on stored configuration rules.

FIG. 4 is a flow diagram illustrating an embodiment of a process for determining a configuration change based on stored configuration rules. In some embodiments, the process of FIG. 4 implements 304 of FIG. 3 in the event that a received performance indication comprises a bandwidth problem. In the example shown, in 400, it is determined that a received performance indication comprises a bandwidth problem. In various embodiments, a bandwidth problem comprises a backup not finishing in time, a backup failing to finish, a communications connection operating too slowly, or any other appropriate bandwidth problem. In some embodiments, the performance indication is received from a client system executing a backup command. In 402, a system modification is determined to increase bandwidth. In some embodiments, a system modification is determined based on stored configuration rules. In some embodiments, a system modification comprises changing a bandwidth time, adding bandwidth, instructing a system to decrease its bandwidth usage, or any other appropriate system modification. In some embodiments, the system to be modified comprises a networking system (e.g., a networking system as in networking system 100 of FIG. 1 or networking system 102 of FIG. 1). In 404, an indication of the system modification is provided (e.g., to the system to be modified). In some embodiments, the system to be modified and the system that the performance indication is received from comprise different systems.

Figure 5:
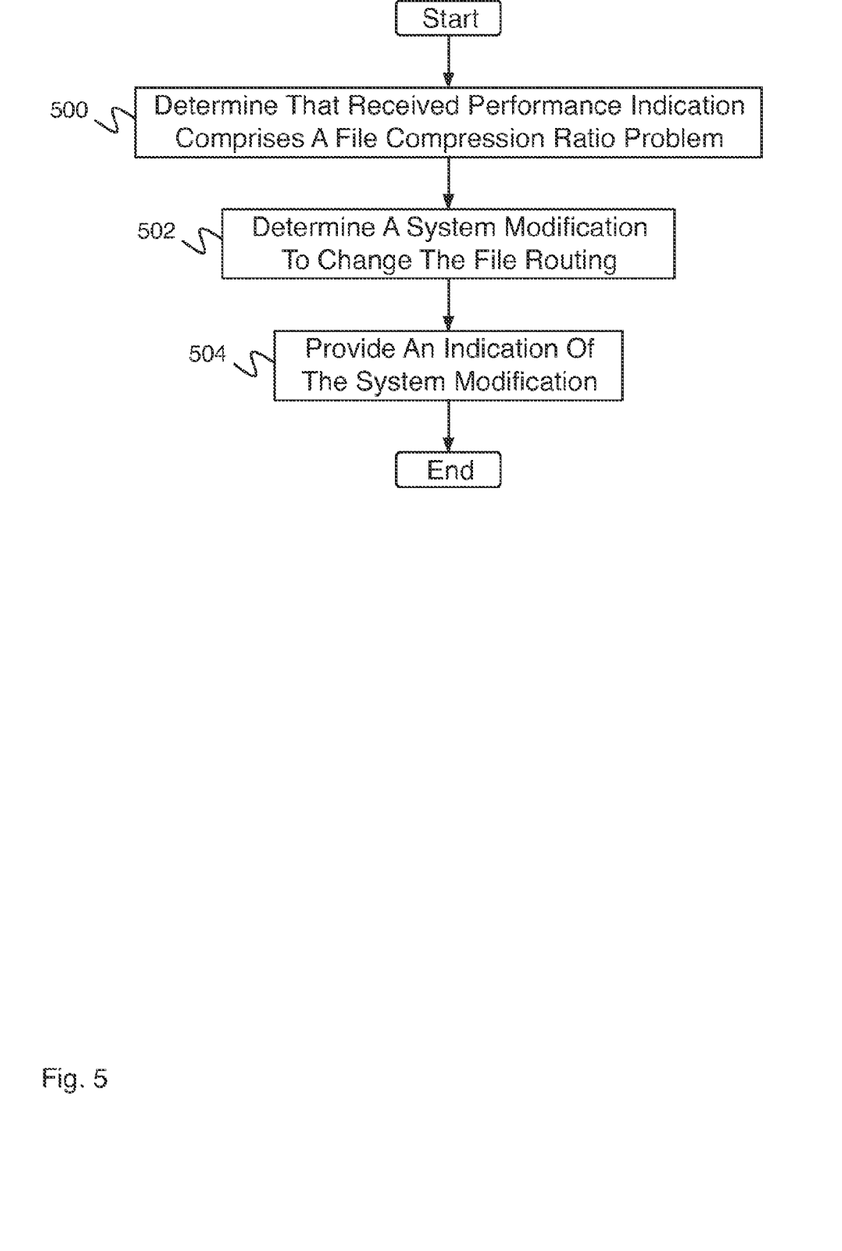
FIG. 5 is a flow diagram illustrating an embodiment of a process for determining a configuration change based on stored configuration rules.

In some embodiments, part of providing a true data protection solution is the ability to do replication for remote relocation of disaster recovery requirements. Often changes in the original design or use of network bandwidth can have a impact on replication causing lag and out of compliance scenarios, placing the business at risk. The ASOPS system will have the ability to recognize any changes in the environment that may cause a lag in replication and either remedy it, (Rule1) or provide and alert, (Rule2):

Input=Network bandwidth availability, remote system information, data synchronicity information Output=Automatic modifications in replication and bandwidth usage Rule1=If network bandwidth utilization changes between replication systems then adjust replication job, start time, duration time, bandwidth throttling, etc., to meet business requirements for SLO Rule2=If data between replication sites is out of sync then check bandwidth current usage, historic usage and generate a detailed alert to user FIG. 5 is a flow diagram illustrating an embodiment of a process for determining a configuration change based on stored configuration rules. In some embodiments, the process of FIG. 5 implements 304 of FIG. 3 in the event that a received performance indication comprises a file compression ratio problem. In the example shown, in 500, it is determined that a received performance indication comprises a file compression ratio problem. In various embodiments, a file compression ratio problem comprises a file not compressing at a desired compression ratio under a desired compression algorithm, a file not compressing at a desired compression ratio after deduplication, a file not compatible with a desired compression algorithm, or any other appropriate file compression ratio problem. In some embodiments, the performance indication is received from a storage system performing a compression algorithm for backup storage. In 502, a system modification is determined to change the file routing. In some embodiments, a system modification is determined based on stored configuration rules. In various embodiments, a system modification comprises routing to a storage system performing a different compression algorithm, routing to a storage system not performing deduplication, or any other appropriate system modification. In some embodiments, the system to be modified comprises a client system (e.g., the client system sending files to be backed up). In 504, an indication of the system modification is provided (e.g., to the system to be modified). In some embodiments, the system to be modified and the system that the performance indication is received from comprise different systems.

In some embodiments, today it is well understood which data formats deduplicate well and which do not. These known formats can be coded into the system such that they can be tracked and rerouted to the most optimal, cost effective storage type available to the ASOPS (Rule1). Over time the ASOPS can learn to reroute for optimization based on data predictive compression ratios (Rule2):

Output=traditional storage (TS), deduplicating storage (DS)

Range1=all known data formats that do not deduplicate well, including but not limited to, .geoTIFF, .jpg, jpeg, .gif, and SRTM, to name a few.

Figure 6:
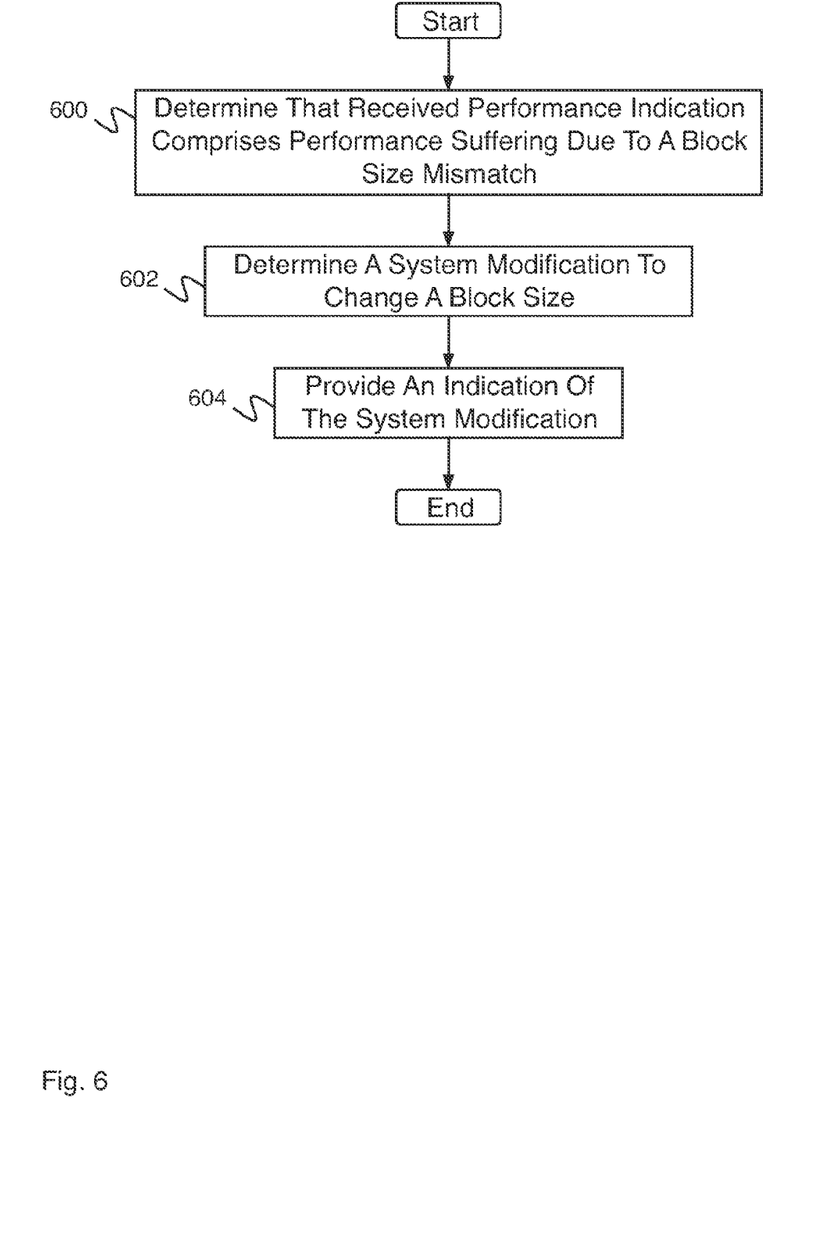
FIG. 6 is a flow diagram illustrating an embodiment of a process for determining a configuration change based on stored configuration rules.

Rule1: If data format for a data set is within Range1, then route to TS; else route to DS Range2=data that has a predicted compression ratio that is less than 20:1 compression ratio Rule2: If data format for a data set is within Range2, then route to TS; else route to DS FIG. 6 is a flow diagram illustrating an embodiment of a process for determining a configuration change based on stored configuration rules. In some embodiments, the process of FIG. 6 implements 304 of FIG. 3 in the event that a received performance indication comprises performance suffering due to a block size mismatch. In the example shown, in 600, it is determined that a received performance indication comprises performance suffering due to a block size mismatch. In some embodiments, performance suffering due to a block size mismatch comprises a data write speed below a data write speed threshold due to a required translation of block size between a first component and a second component. In various embodiments, the performance indication is received from a server system executing a file compression command, a storage system performing a backup, or any other appropriate system. In 602, a system modification is determined to change a block size. In some embodiments, a system modification is determined based on stored configuration rules. In some embodiments, the system to be modified comprises a client system sending data for backup. In 604, an indication of the system modification is provided (e.g., to the system to be modified). In some embodiments, the system to be modified and the system that the performance indication is received from comprise different systems.

In some embodiments, with many servers, optimum performance can only be obtained when using jumbo frames between them and the storage systems, (Rule1). Also, each operating system vendor has its own recommendations for system optimizations. This knowledge can be learned by the ASOPS and implemented in an autonomic way, (Rule2):

Output=Block Size/frame size is modified, host operating system is modified

Range1=Target device=dedup-storage, traditional disk, tape

Rule1: If target is target device is n, then change write-block-size to match target device.

Figure 7:
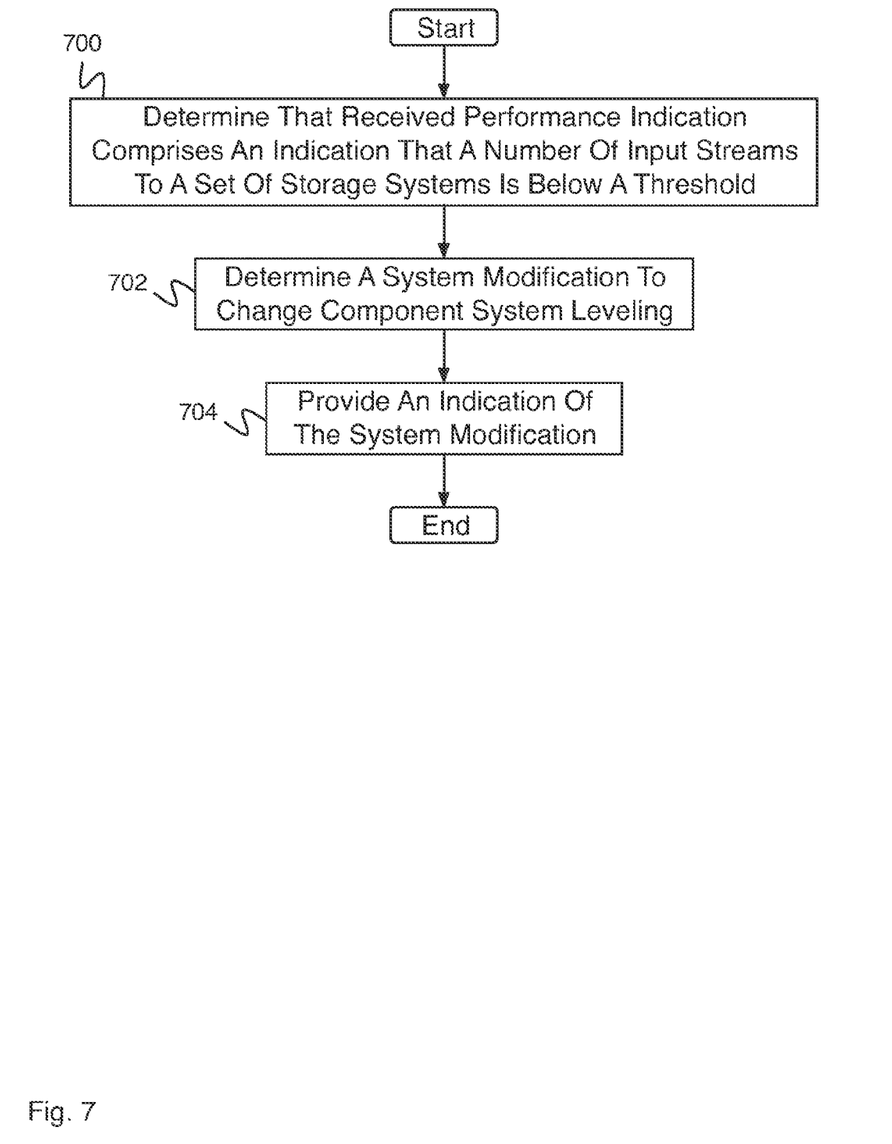
FIG. 7 is a flow diagram illustrating an embodiment of a process for determining a configuration change based on stored configuration rules.

FIG. 7 is a flow diagram illustrating an embodiment of a process for determining a configuration change based on stored configuration rules. In some embodiments, the process of FIG. 7 implements 304 of FIG. 3 in the event that a received performance indication comprises an indication that a number of input streams to a set of storage systems is too small. In the example shown, in 700, it is determined that a received performance indication comprises an indication that a number of input streams to a set of storage systems is below a threshold. In some embodiments, an indication that a number of input streams to a set of storage systems is too small comprises a lowering of data transmission rate due to more components attempting to back up data to the set of storage systems at once than is provided for by the number of input streams. In various embodiments, the performance indication is received from a client system sending data, a storage system storing backup data, or any other appropriate system. In 702, a system modification is determined to change component leveling. In some embodiments, a system modification is determined based on stored configuration rules. In various embodiments, a system modification to change component leveling comprises staggering component backup times, limiting component backup bandwidth, distributing component backups to different backup servers, or any other appropriate system modification. In 704, an indication of the system modification is provided (e.g., to the system to be modified). In some embodiments, the system to be modified and the system that the performance indication is received from comprise different systems.

In some embodiments, the ASOPS system will be able to recognize the maximum possible performance the business can achieve and auto-configure itself to be able to meet the SLO or backup window. Taking into account the available systems and infrastructure, the ASOPS will disallow an unreasonable SLO to be used or configured as well as have the ability to notify an admin when an SLO becomes unobtainable.

The data collection points articulate details regarding application settings, dataset sizes, data types, host memory, CPU, primary storage configuration, disk drive speeds, RAID configuration, network cards and settings, connectivity, available bandwidth, connection hops, switch settings and configuration and available protection storage resources like streams count limitations. This data is then correlated within the ASOPS and tested against an SLO to validate if the SLO can be satisfied (Rule1). If not the ASOPS system will make recommendations (Rule2).

- Input=Environmental information as described above
- Output=SLO that supports the infrastructure and business
- Range1=User defined Data Protection window, Recover Time Objective, Recover Point Objective, Operational Window
- Range2=Measured max speeds of infrastructure data points
- Rule1=If infrastructure data point results fall outside Range1 then alert user
- Rule2=If Range2 falls outside user defined SLO then ASOPS recommends possible SLO options based on Range2

In some embodiments, in any given customer environment an application can be configured in a customized fashion. This can have an impact on the data protection policies. The ASOPS should be able to discover these customizations and adapt itself to operate most optimally for protection of the application.

- Range1=Application backup options
- Range2=Application configuration options
- Rule1=If application backup options are other than default, then ASOPS adapt to new conditions
- Rule2=If application configuration is other than default, then ASOPS adapts to new conditions Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network system, comprising:
   a first component system including a first set of one or more systems;
   a second component system including a second set of one or more systems, the second component system being a different type of system than the first component system, wherein the different type comprises a client system, or a networking system, or a storage system; and
   a system for self-optimization, comprising:
   an interface configured to receive a performance indication from the first component system, wherein the performance indication comprises a file compression ratio problem comprising a file not compressing at a desired compression ratio after deduplication, and an indication that a number of input streams to a set of storage systems is below a threshold; and
   a hardware processor configured to determine a configuration change for the second component system and the first component system based on the received performance indication according to a set of configuration rules, wherein the first component system, the second component system, and the system for self-optimization are physically separate systems in the network system.

2. A network system as in claim 1, wherein the performance indication comprises a bandwidth problem of a backup not finishing in time.

3. A network system as in claim 1, wherein the configuration change for the second component system comprises adding bandwidth.

4. A network system as in claim 1, wherein the first component system comprises the client system and the second component system comprises the networking system.

5. A network system as in claim 1, wherein the first component system comprises the storage system and the second component system comprises the client system.

6. A network system as in claim 1, wherein the configuration change for the second component system comprises routing to the storage system not performing deduplication.

7. A network system as in claim 1, wherein the performance indication comprises a data write speed below a data write speed threshold.

8. A network system as in claim 1, wherein the first component system comprises the storage system performing a backup and the second component system comprises the client system sending data for backup.

9. A network system as in claim 1, wherein the configuration change for the second component system comprises changing a block size.

10. A network system as in claim 1, wherein the configuration change for the second component system comprises changing a backup time.

11. A network system as in claim 1, wherein the first component system comprises the storage system storing backup data and the second component system comprises the client system sending backup data.

12. A method for self-optimization, comprising:
    receiving a performance indication from a first component system including a first set of one or more systems; and
    determining, using a hardware processor, a configuration change for a second component system including a second set of one or more systems and the first component system based on the received performance indication according to a set of configuration rules,
    wherein the performance indication comprises a file compression ratio problem comprising a file not compressing at a desired compression ratio after deduplication and an indication that a number of input streams to a set of storage systems is below a threshold,
    wherein the first component system, the second component system, and the hardware processor are physically separate systems in a network system, the second component system being a different type of system than the first component system, and wherein the different type comprises a client system, or a networking system, or a storage system.

13. A computer program product for self-optimization, the computer program product being embodied in a non-transitory computer readable storage medium and comprising computer instructions for:

receiving a performance indication from a first component system including a first set of one or more systems; and determining, using a hardware processor of the computer, a configuration change for a second component system including a second set of one or more systems and the first component system based on the received performance indication according to a set of configuration rules, wherein the performance indication comprises a file compression ratio problem comprising a file not compressing at a desired compression ratio after deduplication and an indication that a number of input streams to a set of storage systems is below a threshold, wherein the first component system, the second component system, and the hardware processor of the computer are physically separate systems in a network system, the second component system being a different type of system than the first component system, and wherein the different type comprises a client system, or a networking system, or a storage system.

* * * * *